US012618497B2

(12) United States Patent (10) Patent No.: US 12,618,497 B2
Michla et al. (45) Date of Patent: May 5, 2026

(54) POWDER ROTARY FEEDTHROUGH HAVING A PURGE CHAMBER

(71) Applicants: OERLIKON METCO AG, WOHLEN, Wohlen (CH); MOOG GAT GMBH, Geisenheim (DE)

(72) Inventors: Alexander Michla, Hohentengen (DE); Martin Stoeckli, Boswil (CH); Christian Bohnheio, Wohlen (CH); Dennis Hoff, Bodenheim (DE); Peter Stephan, Kesselbach (DE)

(73) Assignees: OERLIKON METCO AG, WOHLEN, Wohlen (CH); MOOG GAT GMBH, Geisenheim (DE)

( * ) Notice: Subject to any disclaimer, the term of this patent is extended or adjusted under 35 U.S.C. 154(b) by 781 days.

(21) Appl. No.: 16/315,351

(22) PCT Filed: Jul. 5, 2017

(86) PCT No.: PCT/EP2017/066781
§ 371 (c)(1),
(2) Date: May 4, 2020

(87) PCT Pub. No.: WO2018/007449
PCT Pub. Date: Jan. 11, 2018

(65) Prior Publication Data
US 2020/0284384 A1 Sep. 10, 2020

(30) Foreign Application Priority Data
Jul. 7, 2016 (DE) ..................... 10 2016 112 470.2

(51) Int. Cl.
F16L 27/08 (2006.01)
B23Q 11/10 (2006.01)

(52) U.S. Cl.
CPC ........ *F16L 27/0804* (2013.01); *B23Q 11/103* (2013.01)

(58) Field of Classification Search
CPC ..... F16L 27/0804; B23Q 11/103; F16J 15/34; B05B 3/026
See application file for complete search history.

(56) References Cited

U.S. PATENT DOCUMENTS 4,817,995 A 4/1989 Deubler et al.
5,922,941 A * 7/1999 Winkler ............... B23Q 11/103
(Continued)

FOREIGN PATENT DOCUMENTS

CN 101384407 3/2009
CN 202065027 12/2011
(Continued)

OTHER PUBLICATIONS

China Office Action conducted in counterpart China Appln. No. 201780042153.4 (Apr. 28, 2020) (w/ translation).
(Continued)

*Primary Examiner* — Zachary T Dragicevich
(74) *Attorney, Agent, or Firm* — GREENBLUM & BERNSTEIN, P.L.C.

(57) ABSTRACT
A rotary feedthrough for the feedthrough of a powder-gas mixture from a stationary machine part into a rotating machine part, with a seal in the form of two flat circular-ring-shaped sliding seal surfaces arranged one on the other in a sliding manner, which sliding seal surfaces are arranged concentric to the axis of rotation of the rotating machine part and which can be moved apart from each other in the axial direction, so that they form a gap, wherein the seal is embedded in a purge chamber having at least one gas inlet and at least one gas outlet.

21 Claims, 5 Drawing Sheets

(56) References Cited

U.S. PATENT DOCUMENTS

| | | | |
|---|---|---|---|
| 5,992,901 A | 11/1999 | Gohres et al. | |
| 6,164,316 A | 12/2000 | Betti | |
| 7,416,070 B2 | 8/2008 | Winkelmann et al. | |
| 2004/0119280 A1* | 6/2004 | Kubala ................ | B23Q 11/103 |
| 2005/0161885 A1 | 7/2005 | Ott | |
| 2006/0273579 A1* | 12/2006 | Ford .................... | B23Q 11/103 |
| 2009/0304943 A1 | 12/2009 | Gollob et al. | |
| 2013/0014827 A1* | 1/2013 | Velasquez ............ | B23Q 11/103 |
| 2015/0123395 A1* | 5/2015 | Weinmann ............. | F16J 15/346 |
| 2016/0018031 A1* | 1/2016 | Petrou .................. | B23Q 11/103 |

FOREIGN PATENT DOCUMENTS

| | | |
|---|---|---|
| CN | 203842373 | 9/2014 |
| DE | 1 999 288 | 6/2009 |
| DE | 10 2008 046 890 | 6/2009 |
| DE | 199 32 355 | 7/2010 |
| DE | 102012018596 | 3/2014 |
| DE | 10 2015 110 988 | 1/2017 |
| EP | 0 981 000 | 2/2000 |
| JP | 51-102033 | 9/1976 |
| JP | 60-154321 | 10/1985 |
| JP | 61-206189 | 12/1986 |
| JP | 4-5587 | 1/1992 |
| JP | 5-133491 | 5/1993 |
| JP | 6-241364 | 8/1994 |
| JP | 6-341438 | 12/1994 |
| JP | 2000169266 A * | 6/2000 |
| JP | 2003-200344 | 7/2003 |
| JP | 2014-185691 | 10/2014 |
| KR | 10 2006 0054039 | 5/2006 |
| KR | 10 2014 0038370 | 3/2014 |
| WO | 2009/116269 | 9/2009 |
| WO | 2012/107012 | 8/2012 |

OTHER PUBLICATIONS

Europe Office Action conducted in counterpart Europe Appln. No. 17 740 335.9 (Mar. 11, 2021).
Korea Office Action conducted in counterpart Korea Appln. No. 10-2019-7003654 (Apr. 20, 2021) (w/ translation).
Int'l Search Report (Form PCT/ISA/210) conducted in Int'l Appln. No. PCT/EP2017/066781 (Sep. 21, 2017).
Int'l Prel. Exam. Rpt. (Form PCT/ISA/237) conducted in Int'l Appln. No. PCT/EP2017/066781 (Sep. 21, 2017).
German Search Report conducted in counterpart German Appln. No. 10 2016 112 470.2 (Jul. 5, 2017).
Japan Office Action conducted in counterpart Japan Appln. No. 2018-569148 (Sep. 15, 2021) (w/ translation).

* cited by examiner

POWDER ROTARY FEEDTHROUGH HAVING A PURGE CHAMBER

CROSS-REFERENCE TO RELATED APPLICATION

This application is a U.S. National Stage of International Application No. PCT/EP2017/066781 filed Jul. 5, 2017, which claims priority to German Application No. 10 2016 112 470.2 filed Jul. 7, 2016. The disclosure of International Application No. PCT/EP2017/066781 is expressly incorporated by reference herein in its entirety.

BACKGROUND

1. Field of the Invention

The invention relates to a rotary feedthrough from a stationary medium into a rotating medium or vice versa. Among other things, a powder-gas mixture is to be fed through.

2. Discussion of Background Information

Rotary feedthroughs for the feedthrough of non-lubricating media from a stationary machine part into a rotating machine part are known. In particular, the keyword "safe to run dry rotary feedthroughs" plays an important role here. While a seal in the form of two flat circular-ring-shaped sliding seal surfaces arranged one on the other in a sliding manner can also be realized for higher rotational speeds and transmission pressures up to 400 bar when feeding through lubricating media, this is only possible with non-lubricating media at lower rotational speeds and pressures. In particular, if the medium does not have to be fed continuously, the sliding surfaces should be moved apart in the axial direction from time to time in order to form a gap and to be able to cool down, whereby the rotating machine part can continue to rotate at a certain rotational speed. Otherwise, the sliding seal surfaces must remain in contact, which limits the rotational speeds and pressures accordingly. In this respect, certain leakage losses cannot be completely avoided.

In DE19932355 B4, leakage losses are reduced by the fact that cylindrical axial cylinder shell surfaces are designed as seal surfaces instead of flat sliding surfaces. With such cylinder surfaces, narrow sealing gaps with much larger surfaces and gap lengths can be realized without changing the radius, i.e. without large radii and corresponding relative speeds, so that the non-lubricating medium can only pass through the cylindrical sealing gap to a small extent.

However, a special case is a so-called powder-gas mixture which is used, for example, in the thermal spraying of cylinder liners and other surfaces. Such a mixture can also be referred to as a non-lubricating medium. However, a cylindrical sealing gap is not an option for this application, as the powder would settle in the sealing gap, which would very quickly lead to seizing of the rotary feedthrough.

For thermal spraying of cylinder liners, coating powder must be reliably transported to a rotating injector and, accordingly, the sealing must be guaranteed at the point of the powder line where the interface between the "rigid" and "rotating" powder lines is located. To explain the application, FIG. 1 shows the gun manipulator RotaPlasma of one of the applicants. The gun manipulator 1 is shown, comprising a powder rotary feedthrough 3, means for current transmission 5, a gun holder 7, a gun connection 9 and finally the gun 11.

A sealing at this interface is of essential importance for the coating process as the powder at the end of the powder line is to be injected into a plasma flame under constant conditions by means of a special powder injector. Under the constant conditions, special attention is paid to the parameters powder speed and powder quantity. These values are negatively influenced in particular by leaks in the powder line. A powder leakage, for example in the region of the powder rotary feedthrough, causes pressure variations which lead to pulsation of the powder. In addition, a leak in the powder line can cause the powder to escape to the outside due to the slight overpressure in the powder line, and thus greatly reducing the quantity of powder transported to the injector. The overpressure within the powder line is 100 to 800 mbar, depending on the parameter.

According to the state of the art, a combination of Teflon bush—seal ring is used for the powder rotary feedthroughs. This was previously possible because, according to the state of the art, the gun of such a device is rotated at just under 200 revolutions per minute. At 200 rpm, however, the device already has a very limited service life, so that this process cannot be operated economically. The aim would also be to be able to operate the device at rotational speeds of up to 800 rpm and preferably more. In combination with an increased conveying rate adapted to the increased rotational speed, it is then possible to produce layers with significantly improved quality, as disclosed in a patent application already pending from one of the applicants. Such high rotational speeds can also be achieved for short periods with conventional devices. If, however, you want to produce layers beyond the laboratory scale, a new variant of the powder rotary feedthrough is required.

It should be noted that the application at 800 rpm and even above is far removed from the rotational speeds of, for example, 20000 rpm that can be achieved in DE 19932355 B4 with non-lubricating media and that the problem of the rotary feedthrough that is safe to run dry described there still plays a subordinate role.

However, with a powder-gas-mixture as medium other and quite serious problems occur. In particular, such a powder has in no case only powder grains of a certain grain size. The grain size can be limited very well towards the top, for example by filtering. However, the presence of smaller particles can only be excluded up to a certain percentage, in particular because particle collisions occur due to the rapid transport of the powder, for example, which lead to fragments of smaller dimensions.

As a result, however, it does not matter how small the gap between the two seal ring disks is, there will always be particles that are even smaller and will sit in the gap. On the one hand, this results in friction. On the other hand, these can lead to an enlargement of the gap, which in turn can result in larger particles settling in the enlarged gap, and so on. In the end, the leakage described above may occur. However, it can also lead to pressure fluctuations due to the changed sealing quality, which in combination with the rotation of the gun can lead to a pulsating powder flow. All this has the consequence that there can be fluctuations in the thickness of the coating when the coating is applied, because both phenomena, powder pulsation and powder leakage, result, as already described above, in an uneven powder application and thus in an uneven coating thickness distribution. This is one of the most important quality features, in particular for the internal coating of cylinder bores, as the layer is then finished by a further process step (honing). An uneven coating thickness distribution causes, among other things, defects on the final machined layer surface caused by an insufficiently high machining allowance. Since this final machined surface (e.g. in a cylinder bore) represents a seal surface to a counter body (e.g. piston with piston rings), the tightness can no longer be sufficiently guaranteed by the formation of such a defect. If this quality defect occurs, for example, in a crankcase, it is associated with relatively high reject costs or rework costs.

It is pointed out in particular that the solution described in DE 199 32 355 B4 by means of sealing cylinder surfaces does not provide any remedy, but additionally leads to the difficulty that fine-grained powder material adheres between the cylinder surfaces and leads to extreme abrasion and thus to the destruction of the cylinder surfaces due to the fast rotation.

However, even in the case of seal rings that slide on each other and have flat sliding surfaces, the penetration of abrasive dust particles or powder components into the sliding seal gap cannot be completely avoided, which in the case of conventional rotary feedthroughs leads to the afore-mentioned very rapid wear of the sliding seal surfaces.

SUMMARY

The invention is therefore based on the object of provid-ing a rotary feedthrough for the feedthrough of a non-lubricating powder-gas mixture, which shows only low wear at moderately high rotational speeds above 200 rpm and up to 2,000 rpm and can therefore be used economically.

This object is met by a rotary feedthrough with the features of claim 1. The rotary feedthrough according to the invention is characterized by a purging channel running transversely to the axis of the sliding seal disks. This channel, which is formed, for example, by two diametrically opposed openings in the housing of the rotary feedthrough, preferably at the axial position of the sliding seal disks, allows a purging agent to flow transversely to the axis of the sliding seal disks and past them on the outside. The purging agent flow, in one variant an air flow, frees these sliding seal surfaces from powder particles of the medium to be con-veyed, in particular when the sliding seal surfaces are moved axially apart for a short time, thereby preventing rapid wear of the sliding seal surfaces.

In order to avoid the extreme abrasion described above, it is advisable to resiliently pretension the flat sliding seal surfaces in contact with each other so that these sliding seal surfaces normally touch each other with a well-defined pressure force. Particle fragments of the powder, which nevertheless get between the sliding surfaces, are carried away by the purging agent flow and do not immediately lead to such extreme damage as described above. In general, the contact pressure of the sliding seal surfaces can be adjusted by the geometry of the transport channel in connection with the pressure prevailing therein, the geometry on the outside of the rotating parts in the purge chamber and the pressure prevailing therein, and finally by selecting the contact spring.

According to the invention, a constant gas flow (purge gas), for example compressed air, is conducted through a purge chamber arranged around the seal surfaces. The purge gas flow preferably used in operation is approx. 200 l/min, the operating pressure is preferably selected between 0.5 and 1 bar. In addition, a pressure surge of purge gas can be intermittently applied to clean the leakage chamber. This can preferably be done every 30 s with preferably max. 1 bar.

The purge chamber and the purge gas have the following effect: powder particles and/or fragments that have pen-etrated between the two seal surfaces are removed from the sliding seal surfaces due to the transverse purge gas flow and the superimposed rotary motion of a seal surface.

In this respect, a part of the powder can be returned to the conveying flow, another part is captured by the volume flow of the purge gas and removed from the purge air chamber (see FIGS. 4, 5). This guarantees that the space surrounding the sliding seal disks, where the spring mechanism is located, which is responsible for the contact force on the seal surfaces, does not gradually fill up with powder and inter-feres with the functioning of the mechanism.

As described above, compressed air can be used as purge gas. However, due to the cleaning process of the seal sliding surfaces described above, a (albeit very small) quantity of purge gas penetrates into the transport channel. For this reason, the carrier gas of the powder-gas mixture or at least a similar gas is used as purge gas in a particularly preferred embodiment of the present invention.

BRIEF DESCRIPTION OF THE DRAWINGS

The invention is now represented in detail and exemplar-ily with reference to the figures.

DETAILED DESCRIPTION

Figure 1:
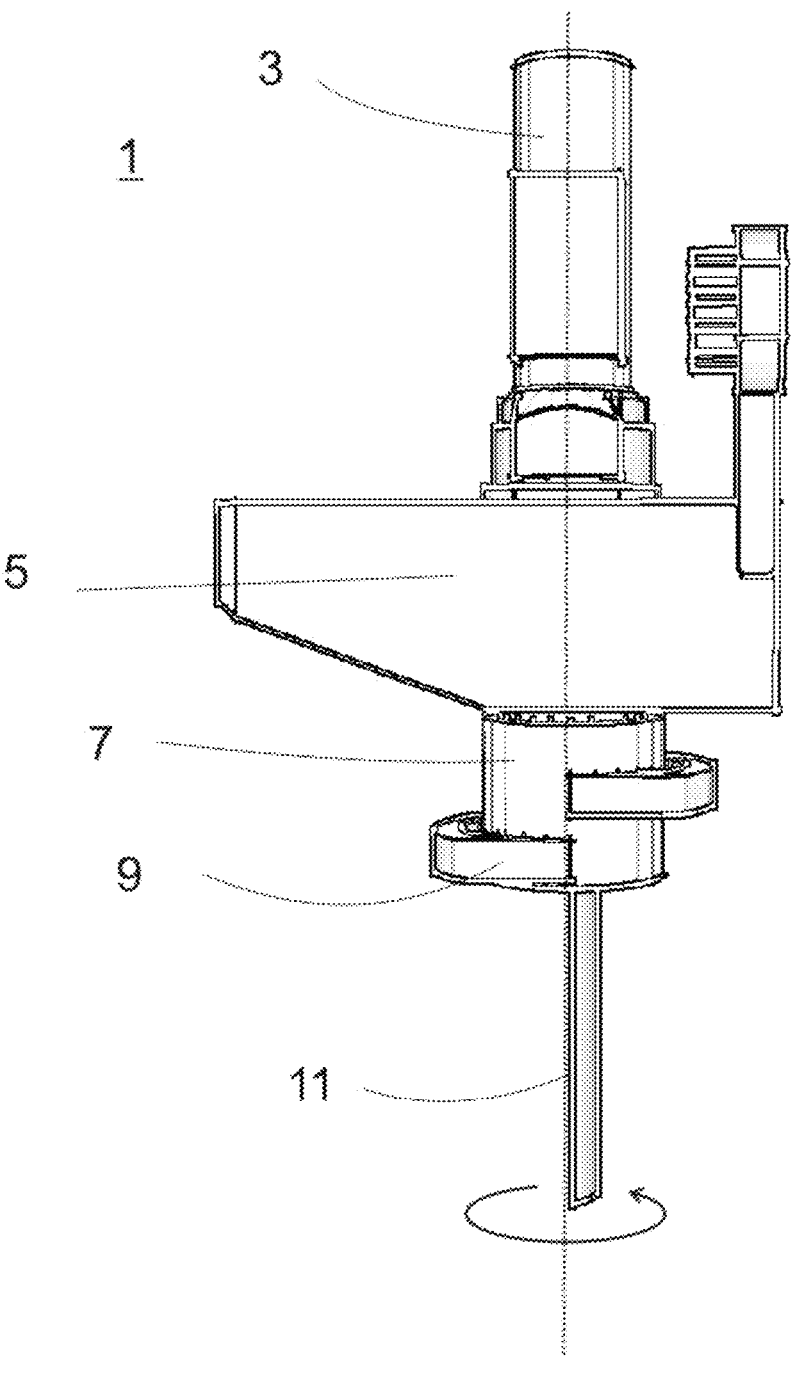
FIG. 1 shows a gun manipulator.
Figure 2:
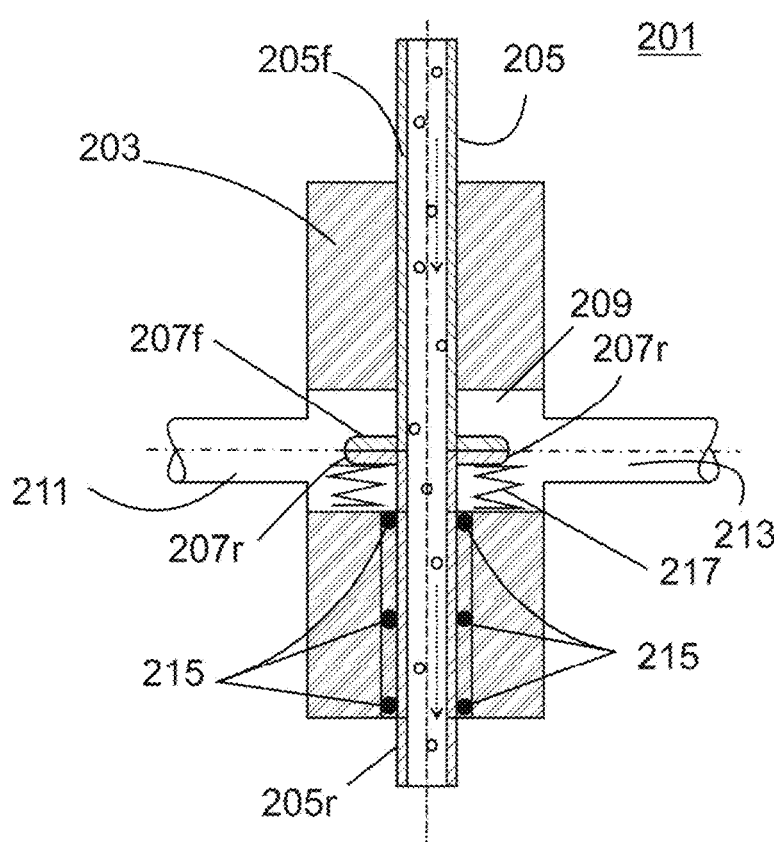
FIG. 2 shows a powder rotary feedthrough according to the invention.

FIG. 2 shows a powder rotary feedthrough 201 according to the invention, which comprises a powder transport chan-nel 205 embedded in a housing 203 with an arrow with a dashed line drawn in the direction of flow of the powder-gas mixture. The small unfilled circles in the powder transport channel should schematically represent the powder particles. The powder transport channel 205 comprises a channel section 205f, which is stationary in the application and a channel section 205r, which rotates in the application. The drawn vertical dashed line shall represent the axis of rota-tion, which is also considered the axis of the rotary feed-through.

If the term rotating components is used here (e.g. channel section 205r), the term essentially refers to rotatable sup-ported components, since the component can rest if the device is not used.

Where the stationary channel section 205f and the rotating channel section 205r meet with their ends, a stationary flat circular-ring-shaped sliding disk 207f is provided on the stationary channel section 205f and a further stationary flat circular-ring-shaped sliding disk 207r is provided on the rotating channel section 205r, which, however, rotates with the channel section 205r. According to the invention, this region of the powder transport channel 205 is enclosed by a purge chamber 209 to which at least one gas supply 211 and at least one gas discharge 213 are connected.

Where the rotating channel 205r is embedded within the housing, it is embedded via rotation-permitting bearings 215, wherein these bearings 215 or further bearings also allow an axial movement relative to the rotation axis.

Pressing means 217, which for example are designed as springs as shown here, press the rotating sliding disk 207r against the stationary sliding disk 207f with predefined pressure.

Figure 3:
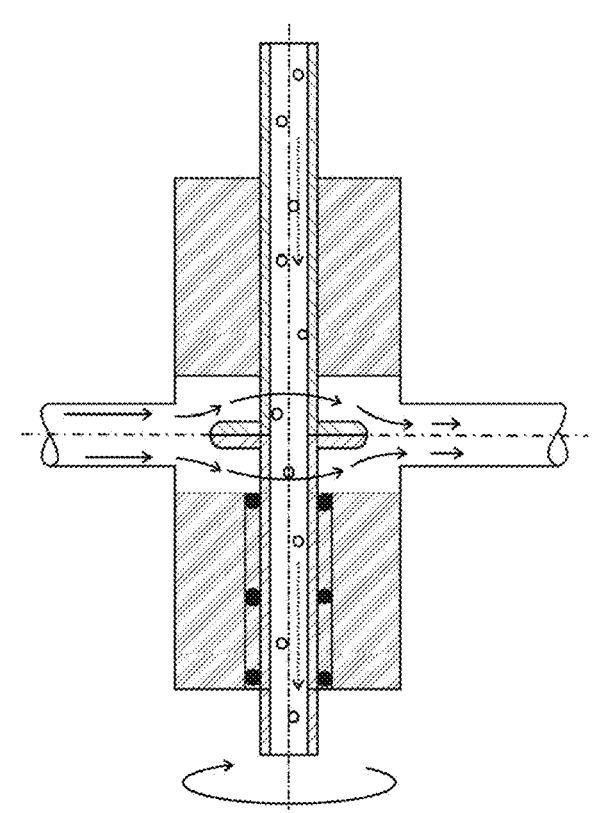
FIG. 3 shows an embodiment of the powder rotary feedthrough in which purge gas flows around the powder transport channel while the seal surfaces are in contact.

In the application, while the powder-gas mixture is transported through the powder transport channel, purge gas is fed into the purge chamber 209 through the gas supply 211 and drawn off again through the gas discharge 213. The purge gas flow can be fed at a higher pressure and passed through the purge chamber than it is inside the transport channel. The corresponding situation is represented schematically in FIG. 3. For reasons of clarity, the reference signs are not repeated in the display of the springs.

Figure 4:
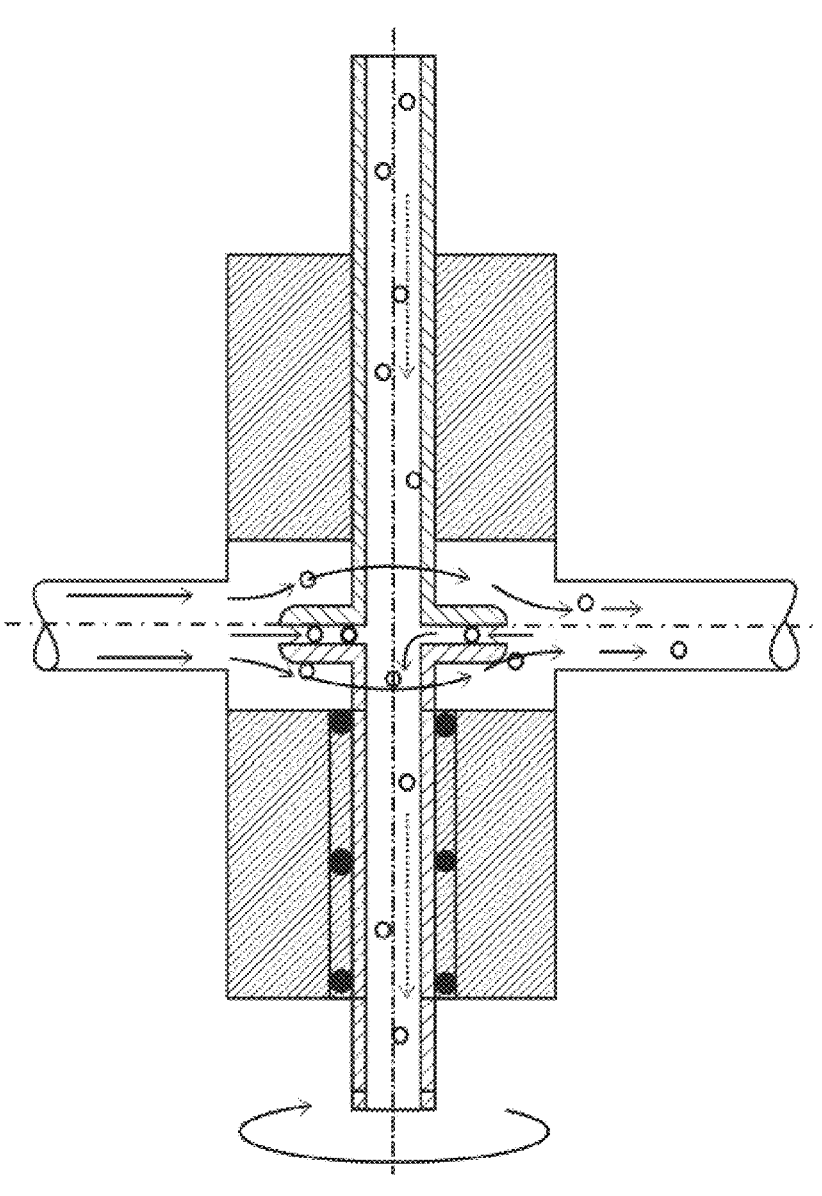
FIG. 4 shows an embodiment of the powder rotary feedthrough in which a gap is formed between the seal surfaces.

As soon as a small gap is formed between the two seal surfaces and powder penetrates between the two seal surfaces, the powder is sucked together with the purge gas into the rotating channel 205r or transported into the purge chamber and powder particles are thus removed from the gap between the sliding disks 207f and 207r, so that the gap closes quickly again essentially due to the spring force (FIG. 4). Due to the overpressure in the purge chamber and the superimposed rotary motion of the sliding disk 207r, the powder preferably returns into the transport channel and the gap between the sliding disks 207f and 207r is freed of powder particles.

Figure 5:
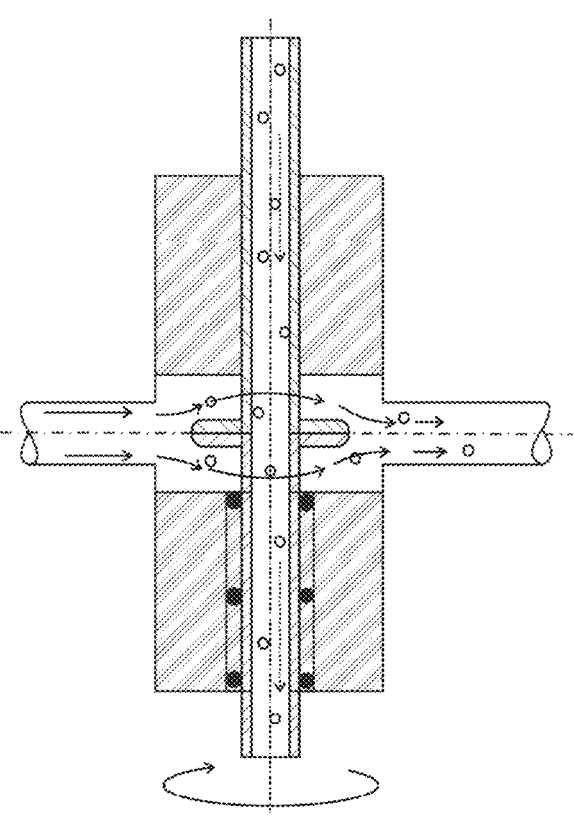
FIG. 5 shows an embodiment of the powder rotary feedthrough in which purge gas removes escaped powder through the gap in FIG. 4.

However, if powder particles have penetrated into the purge chamber as shown in FIG. 5, they are purged out of the purge chamber with the purge gas. This means that the purge chamber has a self-cleaning mechanism.

In an embodiment, the sliding seal disks can be made of ceramic or of hard metal (carbide).

According to a preferred embodiment, the seal surfaces of the sliding disks 205f and 205r are coated with a coating, which on the one hand reduces the friction of the disks and on the other hand, preferably also acts as an anti-adhesion coating against adhesion of the powder particles on the seal surfaces.

The coating, which can be for example a physical vapor deposition (PVD) coating and/or a chemical vapor deposition (CVD) coating, can be designed for example as a ceramic coating or also as a carbon coating. In the case of the carbon coating, it can be advantageous to realize an increasing $sp^2$ hybridized portion to the surface of the seal surfaces, starting from a diamond-like coating. In this way, the layer can comprise the outer component as a run-in coating, which in use wears to a certain depth, i.e., to a certain degree of hardness.

In general, the coating permits the use of non-ceramic, more easily machinable substrate materials that are used for the sliding disks. The simpler processing of the materials allows narrower tolerances to be achieved.

According to a particularly preferred embodiment of the present invention, the mass flow of the purge gas flowing into the purge chamber through the gas inlet is continuously or regularly compared with the mass flow of the gas withdrawn from the purge chamber. If the latter is also only slightly reduced compared to the former, this means that a gap has formed through which the purge gas flows into the transport channel. If necessary, the pretension generated by the springs is then reduced to release powder particles trapped in the gap and thus accelerate the cleaning process.

The sliding seal surfaces have so far been described as flat seal surfaces. However, conical or curved seal surfaces are also conceivable. In fact, all rotationally symmetric surfaces that do not have a cylinder shell component can be used. However, the flat seal surfaces are to be preferred since they offer the least resistance to the purge gas flow and are therefore conducive to an effective purge process.

A rotary feedthrough was disclosed for the feedthrough of a powder-gas mixture from a stationary machine part into a rotating machine part, with a seal in the form of two flat circular-ring-shaped sliding seal surfaces arranged one on the other in a sliding manner, which sliding seal surfaces are arranged concentric to the axis of rotation of the rotating machine part and can be moved apart from each other in the axial direction, so that they form a gap. The rotary feedthrough is characterized in that the seal is embedded in a purge chamber having at least one gas inlet and at least one gas outlet.

The flat seal surfaces are resiliently pretensioned in contact with each another.

The flat seal surfaces can be coated with a friction-reducing coating, preferably with a PVD coating. The coating preferably is a coating which is configured as an anti-adhesion coating for the powder material.

The coating may comprise a ceramic layer and/or a carbon layer, wherein the carbon layer preferably comprises internally a diamond-like carbon (DLC) layer and particularly preferably, starting from the DLC layer towards the surface, comprises a higher $sp^2$ hybridized portion of carbon compounds.

A method for feeding a powder-gas mixture from a stationary machine part into a rotating machine part was disclosed. The method is characterized in that a rotary feedthrough is used as described above and the purge chamber is flowed through by a purge gas at an overpressure compared to the pressure prevailing in the transport channel in such a way that when powder particles penetrate between the sliding surfaces through the gap thereby formed, a flow of purge gas takes place into the transport channel, which flow tears the powder particles out of the gap with it and thus cleans the gap of powder particles.

If powder particles are present in the purge chamber, it can be cleaned by means of the flow of the purge gas.

The invention claimed is:

1. A rotary feedthrough for the feedthrough of a non-lubricating powder-gas mixture from a stationary machine part into a rotating machine part, comprising:

a housing;

a stationary powder transport channel;

a rotating powder transport channel;

a purge chamber comprising at least one opening for the stationary powder transport channel and at least one opening for the rotating powder transport channel, in which the at least one opening for the stationary powder transport channel and the at least one opening for the rotating powder transport channel are concentrically arranged with an axis of rotation of the rotating machine part;

a seal arranged within the purge chamber between facing ends of the stationary powder transport channel and of the rotating powder transport channel, the seal comprising two flat circular-ring-shaped sliding seal surfaces arranged one on the other in a sliding manner, each of the sliding seal surfaces being arranged concentric to the axis of rotation of the rotating machine part and being movable relative to each other in an axial direction along the axis of rotation of the rotating machine part;

the purge chamber further comprising at least one gas inlet and at least one gas outlet, in which the at least one gas inlet and the at least one gas outlet are arranged on diametrically opposing sides of the purge chamber and are aligned transversely to the axis of rotation of the rotating machine part, and the purge chamber also comprising a purging channel connecting the at least one gas inlet and the at least one gas outlet, wherein a purging gas is suppliable from the at least one gas inlet to the at least one gas outlet through the purging channel; and bearings arranged in the housing to allow for rotational and axial movement of the rotating powder transport channel within the purge chamber, wherein the two flat circular-shaped sliding seal surfaces, which include a rotating seal surface that is axially movable within the purging chamber and relative to a stationary seal surface, the rotating seal surface and the stationary seal surface being arranged within the purging channel and within a flow path of the purge gas suppliable through the purging channel from the at least one gas inlet and the at least one gas outlet, wherein the two flat circular-shaped sliding seal surfaces are in contact with each other with a resilient pretensionable force pressing the axially movable rotating seal surface along the axis of rotation toward the stationary seal surface.

2. The rotary feedthrough according to claim 1, wherein the pretension force is adapted to allow the purge gas flow to release powder particles trapped in between the rotating seal surface and the stationary sliding seal surface.

3. The rotary feedthrough according to claim 2, wherein the flat circular ring-shaped seal surfaces are coated with an anti-adhesion coating against adhesion of the powder material on the seal surfaces.

4. The rotary feedthrough according to claim 3, wherein the anti-adhesion coating comprises a ceramic layer.

5. The rotary feedthrough according to claim 4, wherein the carbon layer comprises internally a diamond-like coating (DLC) layer.

6. The rotary feedthrough according to claim 5, wherein starting from the DLC layer towards the flat circular-ring-shaped seal surface, the carbon layer comprises a higher $sp^2$ hybridized portion of carbon compounds.

7. The rotary feedthrough according to claim 3, wherein the anti-adhesion coating is a PVD coating.

8. The rotary feedthrough according to claim 3, wherein the anti-adhesion coating comprises a ceramic layer.

9. The rotary feedthrough according to claim 1, wherein the sliding seal surfaces consist entirely or predominantly of ceramic or of carbide.

10. The rotary feedthrough according to claim 1, wherein the gas inlet and the gas outlet are approximately at an axial height of the sliding seal surfaces.

11. The rotary feedthrough according to claim 1, further comprising a powder-gas transport channel, which includes the stationary powder transport channel and the rotating powder transport channel, arranged concentric with the axis of rotation of the rotating machine part, wherein the stationary powder transport channel is coupled to the at least one opening for the stationary powder transport channel and the rotating powder transport channel is coupled to the at least one opening for the rotating powder transport channel, and wherein the rotating powder transport channel and the stationary powder transport channel are separated from each other by the two flat circular-ring-shaped sliding seal surfaces.

12. The rotary feedthrough according to claim 11, wherein the rotating powder transport channel is arranged for axial movement relative to and for rotational movement relative to the stationary powder transport channel.

13. The rotary feedthrough according to claim 1, further comprising a gas-powder transport channel, which includes the stationary powder transport channel and the rotating powder transport channel, extending through the purge chamber from the at least one opening for a stationary powder transport channel to the at least one opening for a rotating powder transport channel.

14. The rotary feedthrough according to claim 13, wherein, in the gas-powder transport channel, the stationary powder transport channel is coupled to the at least one opening for a stationary powder transport channel and the rotating powder transport channel is coupled to the at least one opening for a rotating powder transport channel.

15. The rotary feedthrough according to claim 14, wherein the two flat circular-ring-shaped sliding seal surfaces are arranged at facing ends of the stationary powder transport channel and the rotating powder transport channel.

16. The rotary feedthrough according to claim 13, wherein a mixture of gas and powder is transported through the gas-powder transport channel at a pressure lower than a pressure in the purge chamber.

17. The rotary feedthrough according to claim 1, wherein the resilient pretensionable force between the two flat circular-shaped sliding seal surfaces is adjustable based upon a comparison of a mass flow of the purging gas flowing into the purge chamber to a mass flow of the purging gas withdrawn from the purge chamber.

18. A method for feeding a non-lubricating powder-gas mixture from a stationary machine part into a rotating machine part through the rotary feedthrough according to claim 1, the method comprising:

directing a flow of purge gas from the at least one gas inlet to the at least one gas outlet through the purge chamber of the rotary feedthrough in such a way that, when a gap is formed between the sliding surfaces, powder particles are removed from the space between the sliding seal surfaces by the flow of purge gas.

19. A method according to claim 18, wherein the purge gas flows through the purge chamber at an overpressure compared with a pressure prevailing in a transport channel through which the gas-powder mixture is fed.

20. A method according to claim 18, wherein, when powder particles are present in the purge chamber, the purge chamber is cleaned of the powder particles via the flow of the purge gas.

21. A method according to claim 18, wherein the purge gas is a same gas as a carrier gas for feeding the powder-gas mixture.

* * * * *